United States Patent
Huang et al.

(10) Patent No.: US 6,483,846 B1
(45) Date of Patent: Nov. 19, 2002

(54) MIDDLEWARE-BASED REAL-TIME COMMUNICATION SYSTEM

(75) Inventors: Jiandong Huang, Plymouth, MN (US); Donghui Chen, Minneapolis, MN (US)

(73) Assignee: Honeywell Inc., Morristown, NJ (US)

( * ) Notice: Subject to any disclaimer, the term of this patent is extended or adjusted under 35 U.S.C. 154(b) by 0 days.

(21) Appl. No.: 09/113,732

(22) Filed: Jul. 10, 1998

(51) Int. Cl.⁷ ............................................. H04L 12/413

(52) U.S. Cl. ....................................... 370/445; 370/462

(58) Field of Search ................................ 370/412, 232, 370/233, 234, 235, 258, 395, 403, 406, 411, 413, 415, 417, 419, 424, 428, 442, 444, 445, 450, 451, 452, 458, 460, 447, 448, 461, 462; 709/240, 223, 224, 235

(56) References Cited

U.S. PATENT DOCUMENTS

| | | | |
|---|---|---|---|
| 5,086,426 A | 2/1992 | Tsukakoshi et al. | 370/85.13 |
| 5,305,317 A | 4/1994 | Szczepanek | 370/85.5 |
| 5,761,430 A | 6/1998 | Gross et al. | 709/225 |
| 5,805,804 A * | 9/1998 | Laursen et al. | 709/223 |
| 5,940,399 A * | 8/1999 | Weizman | 370/445 |
| 6,104,700 A * | 8/2000 | Haddock et al. | 370/235 |
| 6,111,888 A * | 8/2000 | Green et al. | 370/461 |
| 6,161,138 A * | 12/2000 | Gross et al. | 370/225 |
| 6,172,984 B1 * | 1/2001 | Beyda et al. | 370/448 |
| 6,256,317 B1 * | 7/2001 | Holloway et al. | 370/447 |

OTHER PUBLICATIONS

Sharrock S M Et Al: "A CSMA/CD–Based, Integrated Voice/Data Protocol With Dynamic Channel Allocation" Computer Networks and ISDN Systems, vol. 18, No. 1, Nov. 24, 1989, pp. 1–18, XP000070488.

Chitra Venkatramani Et Al; "Design, Implementation and Evaluation of a Software–Based Real–Time Ethernet Protocol" Computer Communcation Review, vol. 25, No. 4, Oct. 1, 1995, pp. 27–37, XP000541648.

Szabo C: "An Ethernet Compatible Protocol to Support Real Time Traffic and Multimedia Applications" Computer Netwoks and ISDN Systems, vol. 29, No. 3, Feb. 1, 1997, pp. 335–342, XP000642427.

Venkatramani, C., "The Design, Implementation and Evaluation of RETHER: A Real–Time Ethernet Protocol", A Dissertation presented at the State University of New York at Stony Brook, cover page, pp. iii–xii and 1–121 (Jan. 1997).

* cited by examiner

*Primary Examiner*—Douglas Olms
*Assistant Examiner*—Phirin Sam
(74) *Attorney, Agent, or Firm*—Schwegman Lundberg Woessner Kluth

(57) ABSTRACT

A middleware approach to implementation of real-time Ethernet that provides deterministic, i.e. predictable, communication services over the conventional Ethernet network is described. The middleware resides above the network interface device and the device driver, yet below the system transport services and/or user applications. The middleware schedules and controls admission of data packets onto the network and guarantees the real-time constraints of the data packets once they are admitted. Collision of data streams is prohibited during transmission of real-time data, yet collisions are allowed during transmission of soft- or non-real-time data for improved utilization of bandwidth. Bandwidth utilization is further optimized by incorporating a quality of service definition into the scheduling determination.

19 Claims, 10 Drawing Sheets

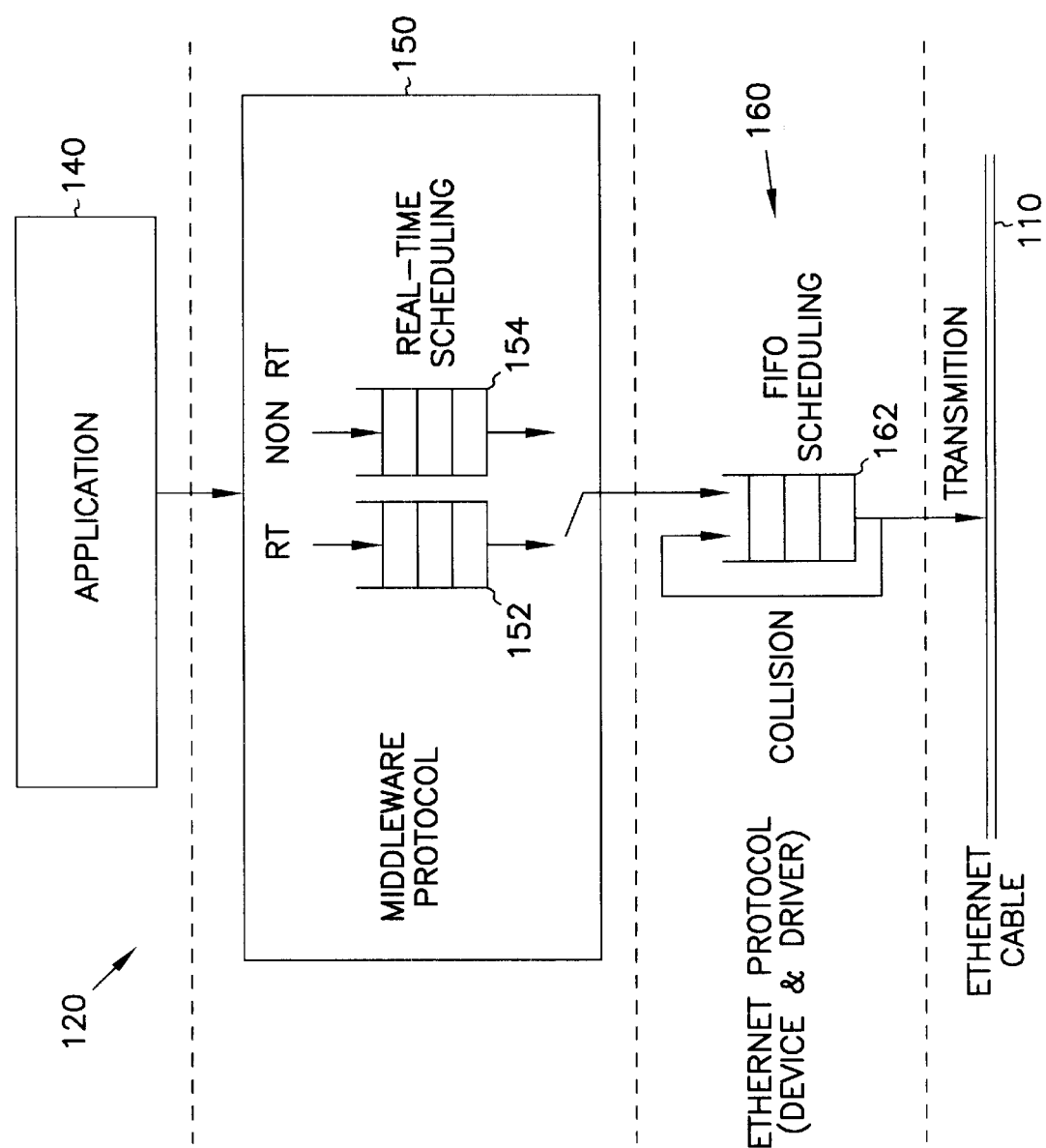

MIDDLEWARE-BASED REAL-TIME COMMUNICATION SYSTEM

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

FIELD OF THE INVENTION

The invention is related to network data communications, and in particular to a middleware approach to implementation of real-time Ethernet.

BACKGROUND OF THE INVENTION

Computer networks have become widely popular throughout business and industry. They may be used to link multiple computers within one location or across multiple sites.

The network provides a communication channel for the transmission of data, or traffic, from one computer to another. Network uses are boundless and may include simple data or file transfers, remote audio or video, multimedia conferencing, industrial control and more.

Perhaps the most popular network protocol is Ethernet, a local area network specification for high-speed terminal to computer communications or computer to computer file transfers. The Ethernet communication protocol permits and accommodates data transfers across a data communication channel or bus, typically a twisted pair or coaxial cable.

The Ethernet communication protocol was standardized as the IEEE 802.3 standard for communications over a local area network (LAN). This protocol incorporates a 1-persistent, Carrier Sense Multiple Access with Collision Detection (CSMA/CD) protocol meaning that one or more nodes of a shared network may monitor the channel if they have a data packet to transmit, and transmit that packet immediately upon detecting the channel to be idle.

A "collision" of data packets may occur if two or more nodes begin transmitting simultaneously on the network. Colliding nodes will detect such a collision of data and terminate their transmission, waiting a randomly-determined time period before attempting transmission again. Under current standards, a failure will be generated after a node makes sixteen unsuccessful attempts to transmit its data packet without collision.

Under lightly-loaded conditions, collisions are infrequent and resolution is rapid. However, heavy loading may lead to indeterminate access time. While some applications may be relatively insensitive to collisions and their resultant delays on data transfer, other applications may be time sensitive such that collisions of data packets are undesirable or even intolerable. Examples of such time-sensitive or real-time applications may include remote video or control of industrial process equipment. The requirement for some applications to circumvent collisions and guarantee successful transmission and reception has led to various improvements to Ethernet.

One Ethernet improvement is a token-based protocol standardized under IEEE 802.4 (Token bus) or 802.5 (Token ring). The primary difference between these two standards is in the network topology each is designed to address. Token bus addresses a network in which the nodes form a logical ring; Token ring addresses a network in which the nodes form a physical ring.

Token-based protocols generate a "token" which is passed to every node along the network. These protocols permit data transmission only when the node is in possession of the token, and each node is given a fixed amount of time to transmit data. This transmission time is further divided into multiple segments or timers relating to different priority levels. These priority levels may be assigned to different data streams depending upon their criticality and time sensitivity. Nodes may only transmit data of a given priority level during its respective timer. Under this approach, real-time data may be assured a fraction of the bandwidth free of collision. However, some of these token-based protocols may allow a given node only its fixed share of bandwidth regardless of whether other nodes make full or even any use of their bandwidth.

Improvements on these token-based protocols have also been proposed. As an example, an academic prototype has been proposed for a software-oriented real-time Ethernet implemented on a UNIX platform utilizing a token-based protocol. (see Chitra Venkatramani, "The Design, Implementation and Evaluation of RETHER: A Real-Time Ethernet Protocol," Ph.D. Dissertation, State University of New York, January 1997) RETHER, however, only provides for non-real time traffic when there is no more real time traffic to be sent by any node. Depending on the type of traffic on the network, this led to low network throughput and utilization due to token passing overhead for non-real time traffic, and did not support hard real time traffic.

Another prior solution is hardware based. Under this approach, data packet collisions are avoided through hardware. These hardware-based solutions may be necessary for certain critical real-time applications such as aviation, to meet stringent performance and reliability requirements. However, such solutions are proprietary and vendor-dependent, making them difficult and expensive to implement. Hardware-based solutions may be incompatible with many existing Ethernet networks, requiring costly and complicated modifications. In addition, although these hardware solutions prevent collisions, they do not offer scheduling of real-time traffic in an entire system. Both solutions also require modification of existing hardware or software.

Accordingly, there exists a need for an efficient deterministic service to prevent collisions of and guarantee real-time traffic over Ethernet that can be implemented on existing Ethernet networks and is compatible with a wide variety of commercial-off-the-shelf (COTS) hardware and applications. Such a solution is needed for process control networks, time sensitive multimedia and Internet applications.

SUMMARY OF THE INVENTION

A middleware approach to implementation of real-time Ethernet provides deterministic, i.e. predictable, communication services for both real time and non-real time traffic over a conventional Ethernet network having a plurality of nodes desiring to transmit packets of data. The middleware comprises computer software residing above a network interface device and the device driver, yet below the system transport services and/or user applications. The invention provides a Middleware Real-Time Ethernet or MRTE which does not require modification to existing hardware that implements Ethernet.

In one embodiment, Ethernet bandwidth is divided into cycles. During each cycle, a first time interval is provided for real time data packet traffic using a deterministic scheduling protocol such as by passing a token, such that no collisions can occur. During a second time interval, the standard carrier sense, multiple access, collision detect Ethernet protocol is used for non-real time traffic. By using these two time intervals, bandwidth is shared between real time and non-real time traffic, ensuring that both will receive desired bandwidth.

In one embodiment, separate queues are used for deterministic scheduling to determine the order of packet queuing and transmission on each node such that (1) real-time traffic can be guaranteed once admitted for transmission service, (2) non-real-time traffic can be served, and (3) the Ethernet bandwidth utilization can be optimized.

Quality of Service, QoS, enables making on-line tradeoffs between network bandwidth availability and network transmission quality. Examples of QoS include (1) degree of packet collisions when Ethernet is shared by soft- or non-real-time traffics during certain time slots and (2) amount of end-to-end packet transmission latency.

When QoS is used, periodic data, such as video at 30 frames per second may be given a priority or criticality, and a cumulative loss factor, e.g. up to four frames in a row may be discarded. If there is sufficient bandwidth remaining after higher priority tasks or data streams are handled, the video will be accepted to the real time queue with at least five frames per second being sent. If other tasks are deleted or reduced, this frame rate will increase.

Software structuring enables hosting of the real-time Ethernet middleware above the Ethernet network device and the device driver, and below system transport software and/or user applications. A specific example of such a software host is the Microsoft® Network Device Interface Specification (NDIS) with Device Driver Kit (DDK) on Microsoft® NT®-based personal computer platforms. Many other software hosts are available depending upon specific hardware chosen.

A collision avoidance module guarantees that a transmission will not result in traffic collision. The collision avoidance module implements a collision-avoidance protocol that provides the capability for preventing Ethernet traffic from colliding, which is one source of the problem of non-deterministic Ethernet behavior. A specific example of such a protocol is a token-based protocol by which a token circulating among the Ethernet nodes determines which node should transmit packets at any point in time. Other collision-avoidance protocols may be used with the invention such as various implementations of Time-Division Multiple Access (TDMA), a technology using Time-Division Multiplexing (TDM). The protocol or standard provides a mechanism to avoid conflict among data transmission by more than one node at any given time.

In one embodiment, the collision-avoidance protocol is switchable to be enabled or disabled as desired by the deterministic scheduling module. This allows the invention to guarantee no collisions of real-time traffic, yet permit collisions of soft- and non-real-time traffic. Such mixed-mode operation could lead to increased bandwidth utilization depending upon the loading during time periods allocated to soft- and non-real-time traffic. Lightly loaded CSMA/CD systems can be more efficient than systems operating on a collision avoidance protocol.

While the collision-avoidance protocol is active, the time set for a complete rotation of transmitting nodes is bounded. In the case of a token-based protocol, the token must return within this bounded time, or token rotation time.

For each collision avoidance protocol (token based or TDMA), a deterministic scheduling module uses an algorithm to schedule traffic and guarantee that transmission will be done before a deadline expires.

In a further embodiment of the invention, allocation of bandwidth to an individual bridge or node is increased based on underutilization of bandwidth by other bridges or nodes in the network.

One advantage of the invention is that it remains compliant with the IEEE 802.3 standard. Such compliance allows the invention to be practiced on a multitude of standard Ethernet networks without requiring modification of hardware, thus remaining an open system.

A further advantage of the invention is that it is modular in nature. As such, the invention may be practiced using a variety of collision-avoidance protocols, deterministic scheduling algorithms, and QoS negotiation and adaptation policies and algorithms.

As a software approach, the invention also enables use of any COTS Ethernet cards and drivers for real-time Ethernet. Use of specific vendor Ethernet cards and drivers is transparent to applications, thus making the invention capable of vendor interoperability, system configuration flexibility and low cost to network users.

BRIEF DESCRIPTION OF THE DRAWINGS

FIG. 2A is a block diagram of a software architecture of an Ethernet node of FIG. 1.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is, therefore, not to be taken in a limiting sense, and the scope of the invention is defined by the appended claims. Like numbers in the figures refer to like components, which should be apparent from the context of use.

Figure 1:
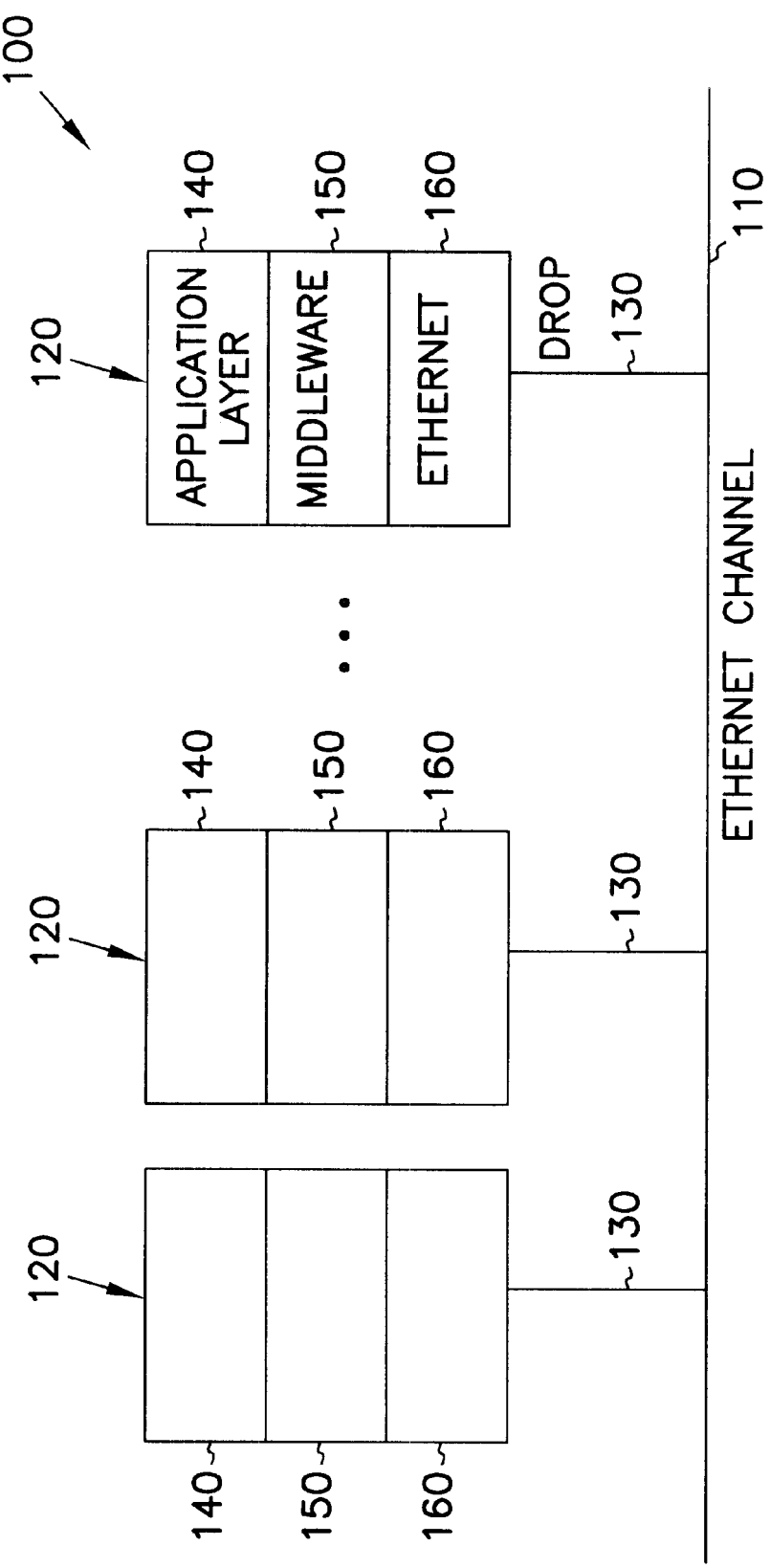
FIG. 1 is a block diagram of an Ethernet network having multiple nodes incorporating the invention

FIG. 1 shows a conceptualized drawing of a simplified Ethernet network incorporating the invention. The Ethernet network 100 comprises an Ethernet channel 110. The Ethernet network 100 further contains two or more nodes 120 which are connected to the Ethernet channel 110 via drops 130 for data receipt and transmission across the Ethernet channel 110. The nodes 120 contain an application layer 140, a middleware real time Ethernet (MRTE) layer 150, and an Ethernet protocol layer 160. The application layer 140 and the MRTE layer 150 are in direct communication and the MRTE layer 150 and the Ethernet protocol layer 160 are in direct communication, but the application layer 140 and the Ethernet protocol layer 160 communicate only through the MRTE layer 150.

FIG. 2A shows more detail of the layers of a node 120. In particular, MRTE layer 150 logically comprises a pair of queues for data traffic or packets generated in the applications layer 140 for transmission to another node. The first queue comprises a real time queue 152 for queuing information packets that have been accepted for transmission on a real time basis. In other words, packets in this queue are guaranteed to be sent without collision with another packet unless there is a network failure. The real time traffic queue 152 has traffic sorted by criticality. A second queue comprises a non-real time queue for data packets that do not need to arrive at a destination in real time to be of value to the receiving node. The second queue 154 is sorted by first in, first out. The queues may be physically separate or combined with appropriate control software. Both of these queues empty into a standard Ethernet collision queue 162 having a first in, first out scheduling algorithm. Applications in the applications layer 140 may assign data to either of the queues as desired.

A bandwidth partition scheme is implemented such that for a given repetitive cycle of time, MRTE layer 150 implements a deterministic schedule for packets in the real time queue where collisions on the network are avoided for a first time period, and a standard Ethernet protocol during a second time period to allow transmission of non-real time packets obtained from the non-real time queue 154.

Figure 2B:
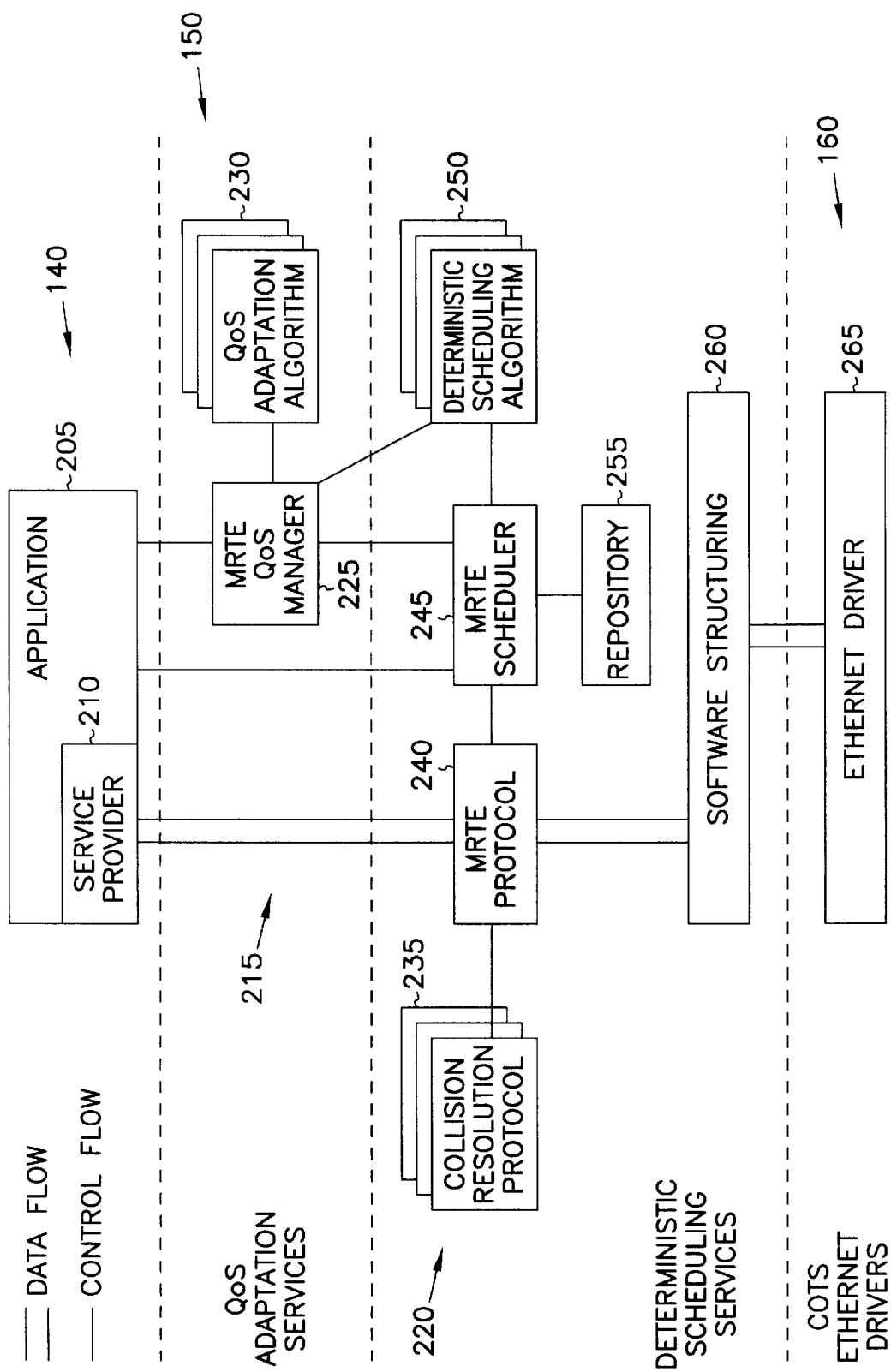
FIG. 2B is a block diagram of the software architecture of FIG. 2 providing more detail of certain portions.

In FIG. 2B, a node is shown having a more detailed representation of the MRTE layer 150, in particular, showing how the real time queue 152 is managed to provide collision avoidance. In the application layer 140, an application 205 is coupled with a service provider 210. In practice, the application 205 acts as either an ultimate source (sender) or destination (receiver) of data packets. The service provider 210 serves as an interface between the application 205 and the MRTE layer 150.

The MRTE layer 150 is further divided into QoS adaptation services 215 and deterministic scheduling services 220, both of which are implemented in software modules or objects in one embodiment. QoS adaptation services 215 contains a QoS manager 225 and a QoS adaptation algorithm 230. The QoS manager 225 and its associated QoS adaptation algorithm 230 provide QoS-based negotiation and adaptation services such as changing the duration of non-real-time data traffic or suspending low-criticality traffic in order to ensure that sufficient collision free bandwidth is provided for high priority real time traffic as balanced against bandwidth for non-real time traffic.

Deterministic scheduling services 220 contains a collision resolution protocol 235, an MRTE protocol 240, and an MRTE scheduler 245 and its associated deterministic scheduling algorithm 250 and MRTE repository 255. Deterministic scheduling services 220 further contains software structuring 260 to host or interface the MRTE layer 150 to the Ethernet protocol layer 160. MRTE protocol 240, with the aid of collision resolution protocol 235, provides arbitration to avoid collisions of data packets. There is one protocol per Ethernet configuration serving data packet transmission. MRTE scheduler 245, with the aid of deterministic scheduling algorithm 250, provides scheduling analysis and coordinates distributed scheduling among individual nodes. There is one scheduling algorithm per Ethernet configuration. MRTE scheduler 245 utilizes MRTE repository 255 for the storage of a local image of global scheduling information.

The Ethernet protocol layer 160 contains the Ethernet driver 265 which supports the Ethernet card (not shown) for physical connection and communications to the Ethernet channel 110 (shown in FIG. 2A). FIG. 2B depicts bidirectional data flow connecting service provider 210 to MRTE protocol 240 to software structuring 260 to Ethernet driver 265. FIG. 2B further depicts control flow connecting the MRTE protocol 240 to the collision resolution protocol 235 and the MRTE scheduler 245. The MRTE scheduler additionally controls flow communication with the applications 205, the QoS manager 225 and the deterministic scheduling algorithm 250. The deterministic scheduling algorithm 250 controls the flow of communication with the QoS manager 225. The QoS manager 225 further controls the flow of communication with the applications 205 and the QoS adaptation algorithm 230.

The various components depicted in FIG. 2B can further be described as software objects as shown in Table 1. The individual software objects communicate via application programming interface (API) calls. The calls associated with each object are listed in Table 1.

TABLE 1

Software Objects and API calls

| Object | Responsibility | API |
|---|---|---|
| MRTE Service Provider 210 | a) MRTE interface to application<br>b) Buffering for received packets | Admit()<br>IndicateAdmit()<br>Send()<br>Receive()<br>IndicateReceive() |
| QoS Manager 225 | a) QoS negotiation<br>b) QoS adaptation | Admit() |
| MRTE Scheduler 245 | a) Deterministic bandwidth scheduling<br>b) Setting up fragmentation parameter | Admit()<br>IndicatePermission() |
| Deterministic Scheduling Algorithm 250 | Provide a scheduling algorithm and conduct schedulability analysis accordingly | Schedule(IN req, IN QoS, OUT frag) |
| MRTE Protocol 240 | a) Arbitration to control I) traffic collision; and ii) scheduling sequence<br>b) Packet fragmentation and transmission via Software Structuring | GetPermission()<br>Update(SteamID, frag, . . .<br>Send()<br>IndicateReceive()<br>TransferData() |
| MRTE Repository 255 | Local image of global scheduling information | Get()<br>Update() |
| Software Structuring 260 | a) Framework for "plug-n-play" drivers and SPI | Send()<br>TransferData() |

Figure 3:
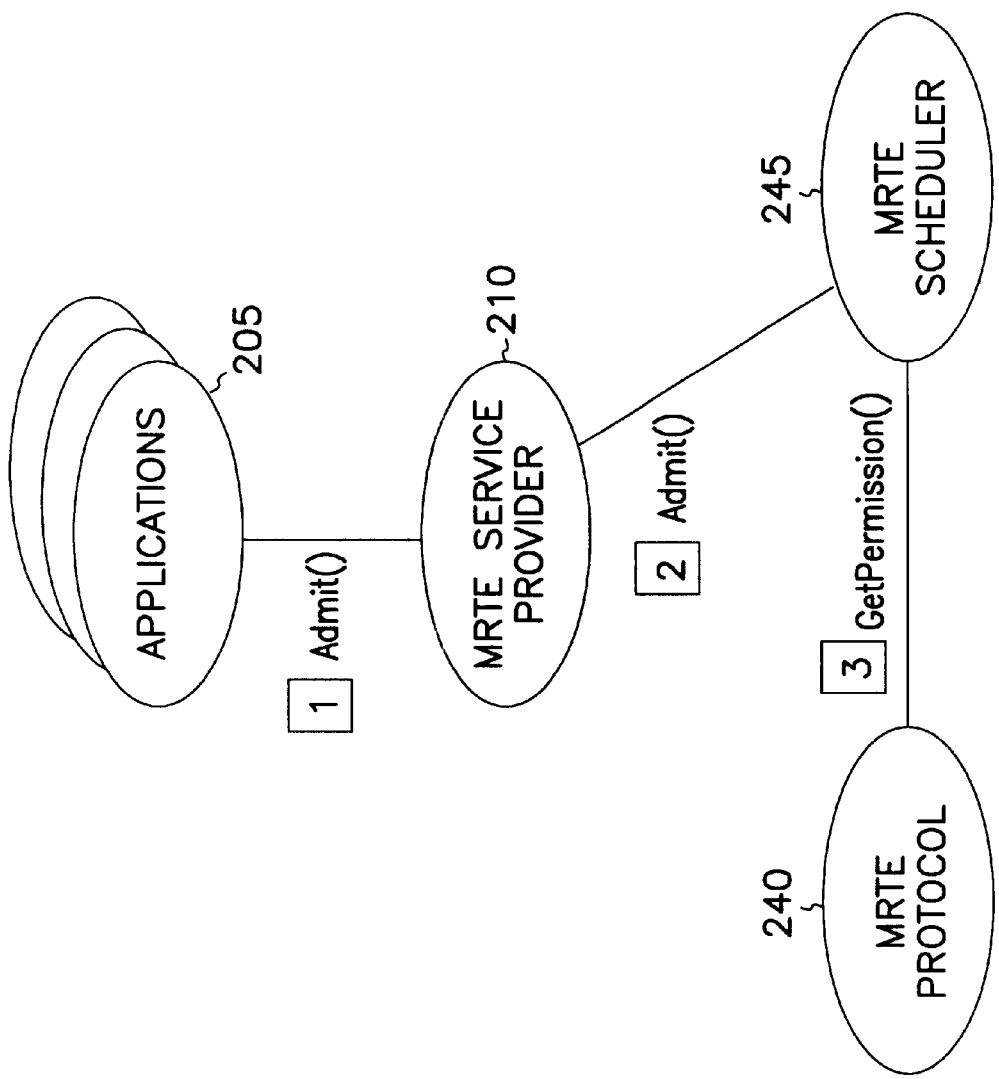
FIG. 3 is a diagram depicting the behavior of a node in response to an application request for admission to the network.
Figure 4:
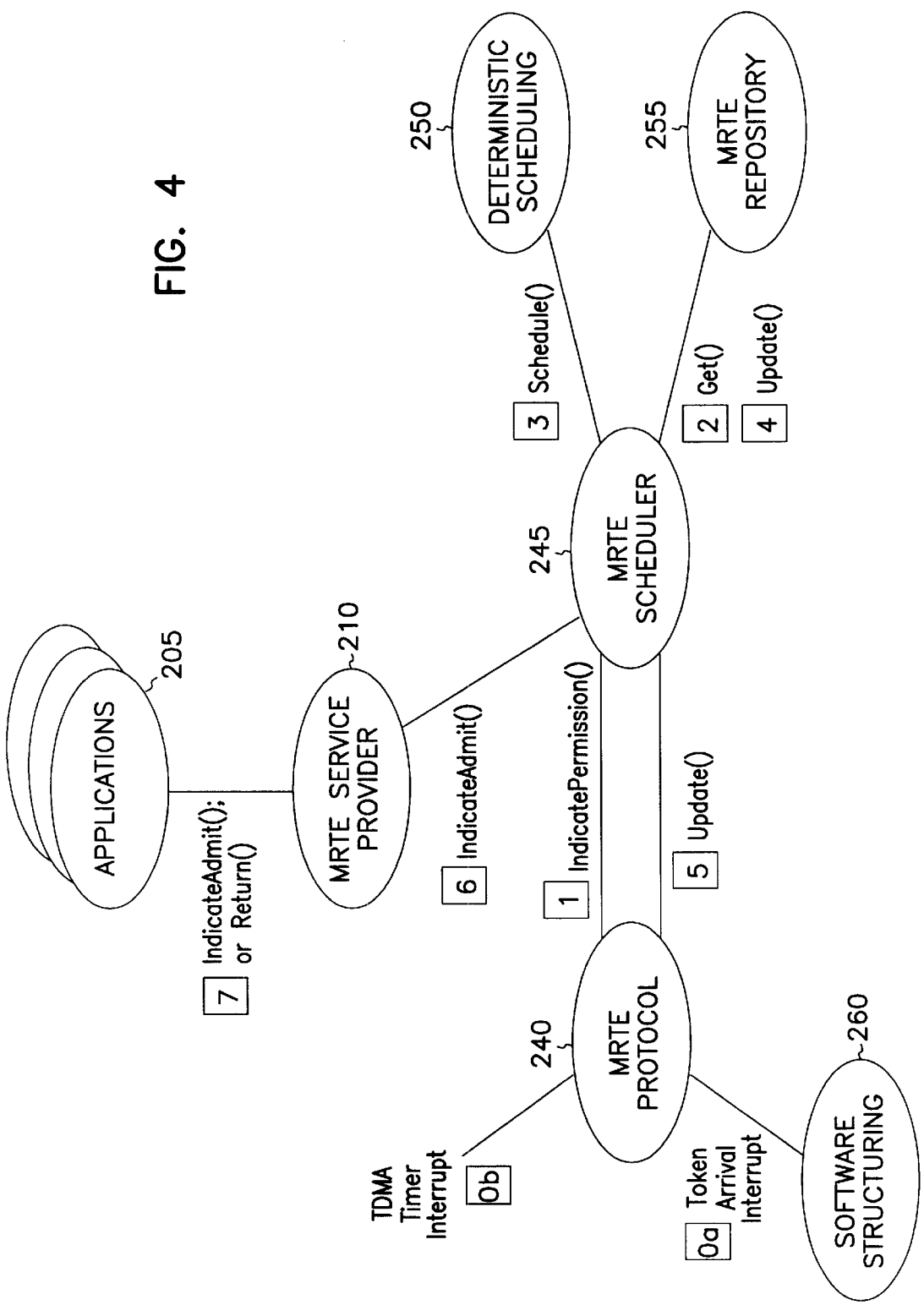
FIG. 4 is a diagram depicting the behavior of a node in response to a scheduler interrupt granting admission to the network.

Admission control to the network may be initiated in one of two ways. Admission may be requested by the applications or it may be initiated by a scheduler interrupt. FIGS. 3 and 4 depict the behavior of the various components in controlling admission.

FIG. 3 depicts the behavior in response to an application request. Applications 205 will make an Admit( ) call on the MRTE service provider 210 to indicate a desire to transmit data across the network. MRTE service provider 210 in turn forwards the Admit( ) call to the MRTE scheduler 245. MRTE scheduler 245 then invokes a GetPermission( ) call on the MRTE protocol 240 to indicate that a request for admission is pending.

FIG. 4 depicts the behavior in response to a scheduler interrupt. An interrupt is first received by the MRTE protocol 240 in a form dictated by the collision avoidance protocol chosen. For a token-based protocol, the interrupt is received from software structuring 260 and indicates receipt of the token by an individual node. For a TDMA-based protocol, the interrupt is generated by the TDMA timer (not shown) and indicates that the time slot is appropriate for data transmission by an individual node. Upon receipt of the interrupt, MRTE Protocol 240 makes an IndicatePermission ( ) call on the MRTE scheduler 245. MRTE scheduler 245 then makes a Get( ) call on MRTE repository 255 to get network status information. MRTE scheduler 245 then makes a Schedule( ) call on the deterministic scheduling algorithm 250. The MRTE repository 255 issues an Update ( ) call to provide the network status to MRTE scheduler 245, which is then forwarded to MRTE protocol 240 through an Update( ) call issued by MRTE scheduler 245.

Upon updating MRTE protocol 240 with network status information, MRTE scheduler 245 makes an IndicateAdmit ( ) call on MRTE service provider 210 to signal that admission to the network has been enabled. MRTE service provider 210 then forwards the IndicateAdmit( ) call to applications 205.

Figure 5:
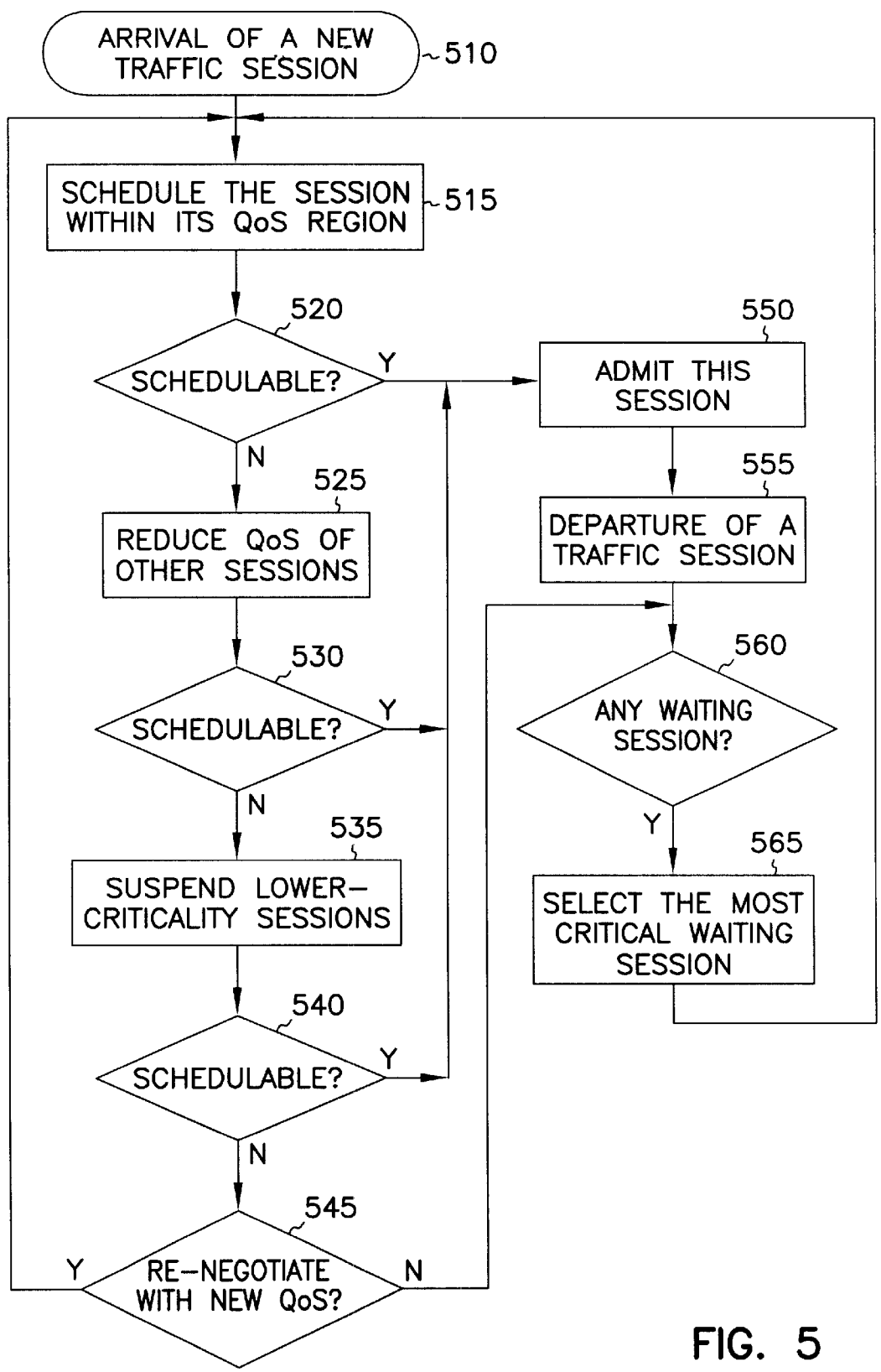
FIG. 5 is a flowchart depicting the behavior of the QoS manager of one embodiment of the invention.

FIG. 5 is a flowchart describing the general behavior of the QoS manager 225 (shown in FIG. 2B). The behavior is implemented in software in one embodiment in the C++ language and comprises multiple objects which may or may not correspond precisely with the logical blocks used to describe the behavior. Further languages and different programming styles and hardware or firmware may be used in other embodiments as is well known in the art. The QoS manager is represented by start block or box 510; action boxes 515, 525, 535, 550, 555 and 565; and decision boxes 520, 530, 540, 545 and 560. The initialization of the QoS manager 225 is indicated by the arrival of a new traffic session in start box 510. The arriving session comprising a known number or frequency and size of packets to be sent to another node is scheduled within its QoS region in action box 515. A decision is made in decision box 520 as to whether the session is schedulable. If the session is schedulable, flow is transferred to action box 550 for admission of the session.

If the session is not schedulable at this point, the QoS of other sessions may be reduced in action box 525. This process is highly dependent on the particular application being serviced. There is usually a number of different levels of criticality of data associated with any application which are readily adaptable to QoS as is known in the art. An admission decision will then be made in decision box 530. If the session is schedulable, flow will be transferred to action box 550 for admission of the session. Further detail on the schedulability and admission decision processes is provided below.

If the session is not schedulable at this point, QoS manager 225 may suspend lower criticality sessions. An admission decision is then made in decision box 540. If the session is schedulable, flow is transferred to action box 550 for admission of the session.

If the session is not schedulable at this point, a decision must be made in decision box 545 as to whether scheduling should be re-negotiated with a higher QoS for the session. If re-negotiation is required, flow is transferred to action box 515 to repeat the scheduling analysis. If re-negotiation is not required, flow is transferred to decision box 560 to be placed in a wait queue.

Upon admission of the traffic session at action box 550, the session will be sent by action box 555. Once a session is sent by action box 555, decision box 560 will evaluate whether there are any unadmitted or waiting sessions. If there are waiting sessions, flow is transferred to action box 565 where the most critical waiting session is chosen. Flow is then transferred to action box 515 to repeat the scheduling analysis. If there are no waiting sessions, the process is concluded until new sessions arrive.

Figure 6:
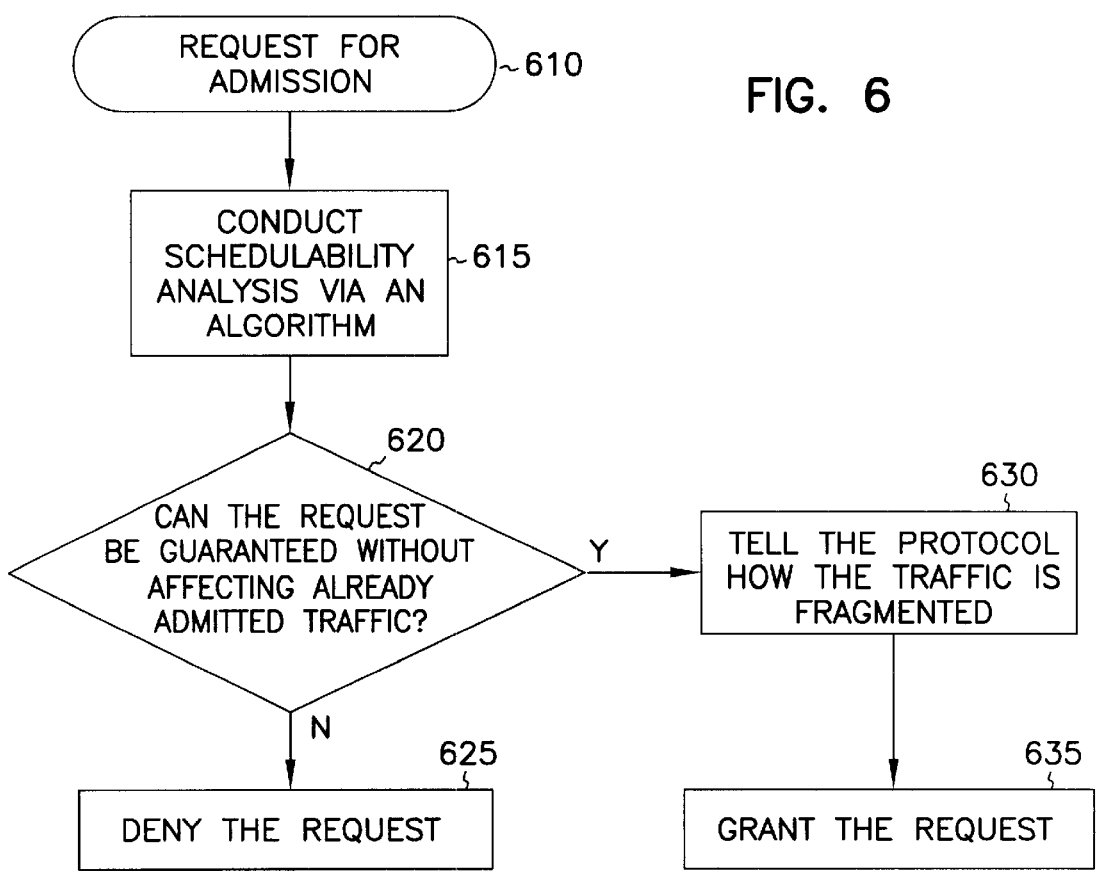
FIG. 6 is a flowchart depicting the behavior of the scheduler of invention.

FIG. 6 is a flowchart describing the general behavior of the MRTE scheduler 245 (shown in FIG. 2B). The MRTE scheduler is represented by start box 610; action boxes 615, 625, 630 and 635; and decision box 620. The initialization of the MRTE Scheduler 245 is indicated by a request for admission in start box 610. The request is analyzed according to deterministic scheduling algorithm 250 (shown in FIG. 2B) in action box 615. Upon determining the schedulability in action box 615, MRTE scheduler 245 must decide, in decision box 620, whether the request can be guaranteed without adversely affecting already-admitted traffic.

If the request can be granted without adverse effects, MRTE scheduler 245 informs MRTE protocol 240 as to how the traffic is fragmented in action box 630. MRTE scheduler 245 then grants the request in action box 635. If the request cannot be granted without adverse effects, MRTE scheduler 245 will deny the request at action box 625. Once the request is either granted or denied, the process terminates.

Figure 7:
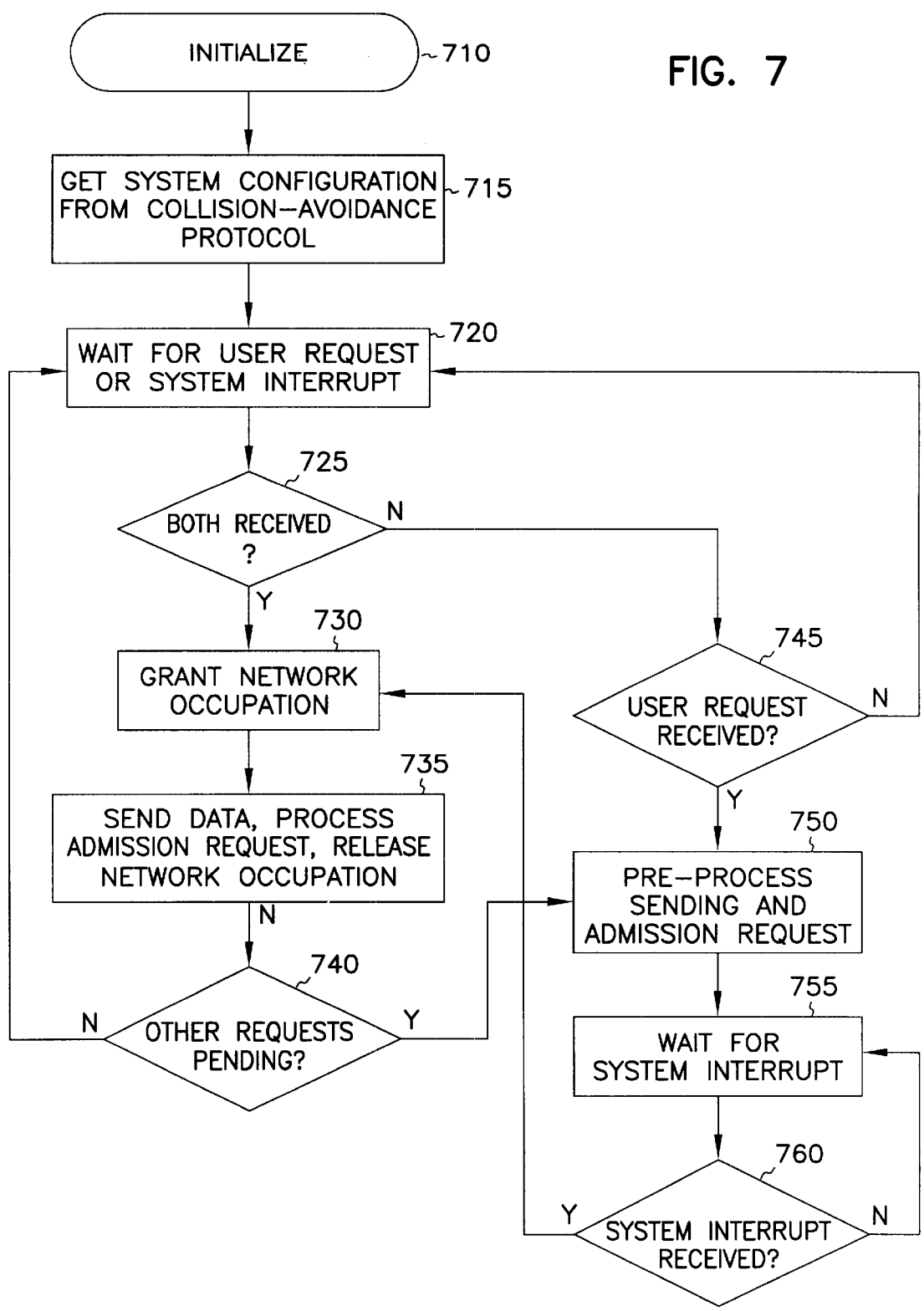
FIG. 7 is a flowchart depicting the behavior of the MRTE protocol of the invention.

FIG. 7 is a flowchart describing the general behavior of the MRTE protocol 240 (shown in FIG. 2B). The MRTE protocol is represented by start box 710; action boxes 715, 720, 730, 735, 750 and 755; and decision boxes 725, 740, 745 and 760. MRTE protocol 240 begins the process of network admission as indicated by an initialization in start box 710. Upon initialization of the MRTE protocol 240, system configuration information is gathered from the collision resolution protocol 235 (shown in FIG. 2B) as indicated in action box 715. MRTE protocol 240 then waits for a user request and system interrupt in action box 720. A decision is made in decision box 725 as to whether one or both wait states have been satisfied. If both have been satisfied, flow is transferred to action box 730 to grant network occupation.

If both wait states of action box 720 have not been satisfied, MRTE protocol 240 decides if a user request was received in decision box 745. If not, flow will return to action box 720 to continue waiting. If a user request was received, MRTE protocol 240 then pre-processes the sending and admission request in action box 750. It then waits for the system interrupt in action box 755. Once the system interrupt is received, flow is transferred to action box 730 to grant network occupation.

Once network occupation is granted in action box 730 by either route, MRTE protocol 240 sends the data, processes the admission request and releases the network occupation in action box 735. It will then determine if other send requests are pending in decision box 740. If send requests are pending, flow is transferred to action box 750 for pre-processing. If no send requests are pending, flow is transferred to action box 720 to wait for further requests and system interrupts.

Figure 8:
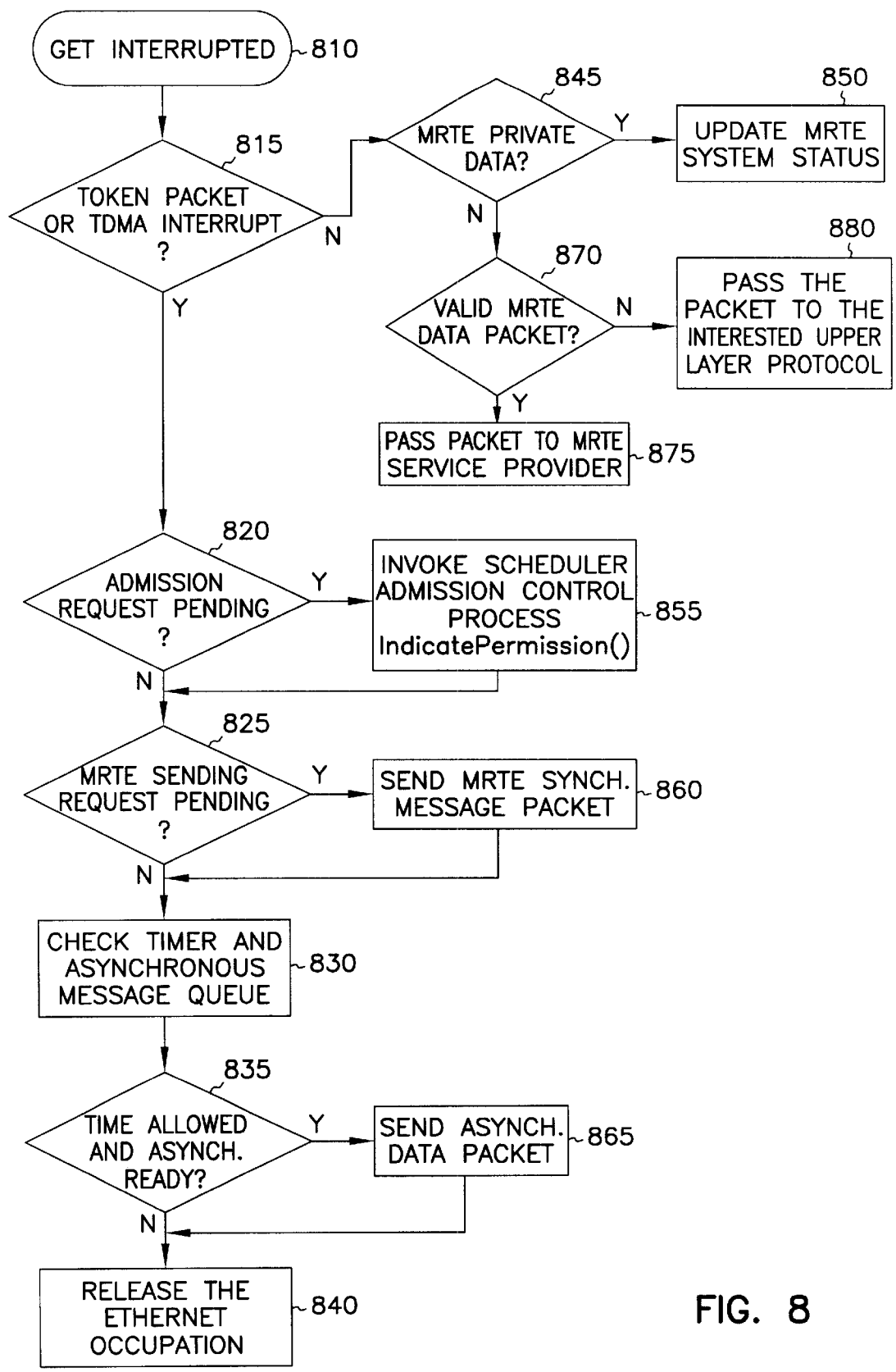
FIG. 8 is a flowchart depicting the interrupt handler of the MRTE protocol of the invention.

FIG. 8 is a flowchart of the interrupt handling of MRTE protocol 240 (shown in FIG. 2B). MRTE protocol 240 is represented by start box 810; action boxes 830, 840, 850, 855, 860, 865, 875 and 880; and decision boxes 815, 820, 825, 835, 845 and 870. The process is initiated in start box 810 with receipt of an interrupt. MRTE protocol then decides in decision box 815 whether the interrupt is a token packet or TDMA interrupt from collision resolution protocol 235. If it is an interrupt from collision resolution protocol 235 (shown in FIG. 2B), MRTE protocol 240 decides whether an admission request is currently pending in decision box 820.

If the interrupt is not from collision resolution protocol 235, MRTE protocol 240 decides in decision box 845 whether the interrupt represents an MRTE private data packet containing MRTE system status information. If it is MRTE private data, MRTE protocol 240 updates its system status in action box 850. If not MRTE private data, MRTE protocol 240 decides in decision box 870 if it is a valid incoming MRTE data packet. If it is a valid data packet, MRTE protocol 240 passes the packet on the MRTE service provider 210 (shown in FIG. 2B) in action box 875. If the interrupt is not a valid MRTE data packet, MRTE protocol 240 passes the packet to the interested upper layer protocol in action box 850, which is not defined by the invention.

If there are pending admission requests at decision box 820, MRTE protocol 240 will invoke MRTE scheduler 245 (shown in FIG. 2B) in action box 855, making the IndicatePermission( ) API call. After invoking MRTE scheduler 245, or if there are no pending admission requests, flow is transferred to decision box 825 to determine if there are any MRTE sending requests pending. If sending requests are pending, MRTE protocol sends the MRTE synchronous message packet in action box 860. After sending the synchronous packet, or if there are no sending requests pending, flow is transferred to action box 830.

In action box 830, MRTE protocol 240 checks the timer and asynchronous message queue. Based on available time and the asynchronous message queue, MRTE protocol 240 decides in decision box 835 whether there is transmission time available and whether there are asynchronous messages ready. If time is available and asynchronous data packets are ready for transmission, MRTE protocol 240 sends the asynchronous data packets in action box 865, then releases the Ethernet occupation in action box 840. If time is not available or there are no asynchronous data packets ready for transmission, MRTE protocol 240 simply releases the Ethernet occupation in action box 840.

Figure 9:
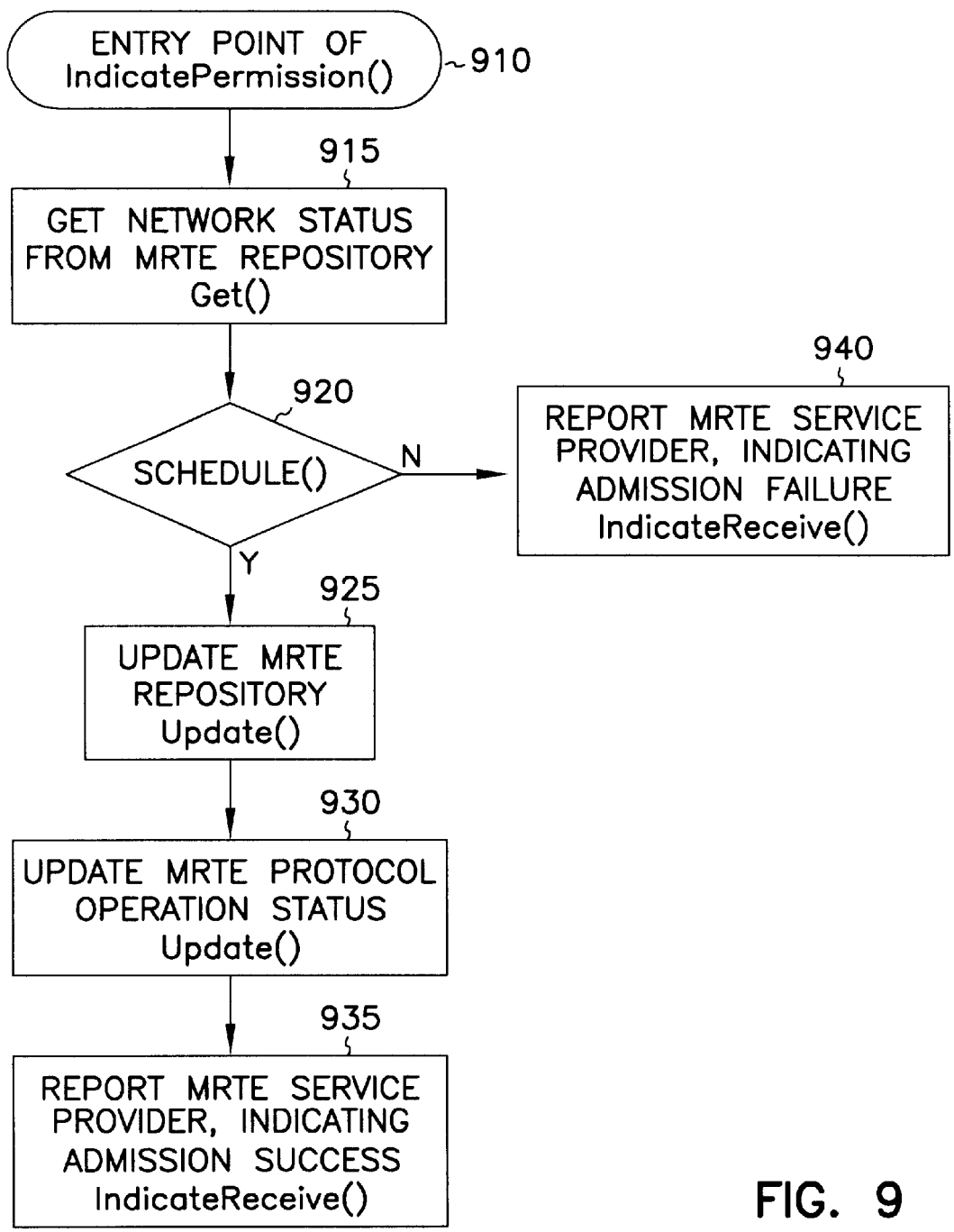
FIG. 9 is a flowchart depicting the admission control process of the scheduler of the invention.

FIG. 9 is a flowchart of the admission control process of the MRTE scheduler 245 (shown in FIG. 2B) and comprises start box 910; action boxes 915, 925, 930, 935 and 940; and decision box 920. As shown in box 910, the process is initialized by the receipt of the IndicatePermission( ) call from MRTE protocol 240 (shown in FIG. 2B). Upon initialization, MRTE scheduler 245, in action box 915, obtains the network status information from the MRTE repository 255 (shown in FIG. 2B) using the Get( ) call. MRTE scheduler 245 then determines if the send request can be scheduled by making the Schedule( ) call at 920 to the deterministic scheduling algorithm 250 (shown in FIG. 2B). If the request cannot be scheduled, MRTE scheduler 245 reports, in action box 940, to MRTE service provider 210 (shown in FIG. 2B) indicating admission failure using the IndicateReceive( ) call [at 940]. The scheduling and admission control algorithms are encapsulated in a deterministic scheduling policy class, based on different protocols like token based or TDMA.

If deterministic scheduling algorithm 250 determines that the send request can be scheduled, MRTE scheduler 245 updates MRTE repository 255 in action box 925 using the Update( ) call. MRTE scheduler 245 then updates the MRTE protocol 240 with operation status information in action box 930 using the Update( ) call. Finally, MRTE scheduler 245 reports, in action box 935, to MRTE service provider 210 indicating admission success using the IndicateReceive( ) call.

There are two traffic models to be considered. The first is a periodic or synchronous message stream. The factors involved in this traffic model for each node 120 are its period (Pj); message length or transmission time (Mj); deadline (Dj); QoS (Qj); and criticality or level of importance (Cj) where "j" represents an individual message stream. The second traffic model is an aperiodic or asynchronous message stream. The factors involved in this traffic model for each node 120 are the same as the periodic model with the elimination of the period (Pj).

In one embodiment, deterministic scheduling algorithm 250 utilizes a set of equations to determine if a request is schedulable in one embodiment. The relevant equations are as follows:

$$TTRT = \min(P_j)/2, \forall j \qquad \text{Eq. 1:}$$

$$T_{NRT} = TTRT - T_{RT} \qquad \text{Eq. 2:}$$

$$\text{Eq. 3:} \quad H_i = \sum_{j=1}^{m_i} \left\{ \frac{M_j}{\left\lceil \frac{\min(D_j, P_j)}{TTRT} \right\rceil - 1} + O_j \right\}$$

$$\text{Eq. 4:} \quad \sum_{i=1}^{n} H_i + T_{NRT} \leq TTRT$$

Where the following additional definitions apply:
TTRT: Target Token Rotation Time
$T_{RT}$: Time interval for transmitting real-time traffic
$T_{NRT}$: Time interval for transmitting soft- or non-real-time traffic
I: Node number
j: Data stream number
$H_i$: Token holding time of individual node I
$O_j$: Software overhead of transmitting data stream j
n: Total number of nodes
$m_i$: Total number of real-time packets for transmission within $H_i$ A new request will be schedulable if Equation 4 is true, given Equations 1, 2 and 3.

Conclusion

A middleware approach to implementation of real-time Ethernet has been described which provides deterministic, i.e. predictable, communication services for both real time and non-real time traffic over a conventional Ethernet network having a plurality of nodes desiring to transmit packets of data. The middleware comprises computer software residing above a network interface device and the device driver, yet below the system transport services and/or user applications. The invention provides a Middleware Real-Time Ethernet or MRTE which does not require modification to existing hardware that implements Ethernet. Separate queues are used for deterministic scheduling to determine the order of packet queuing and transmission on each node such that (1) real-time traffic can be guaranteed once admitted for transmission service, (2) non-real-time traffic can be served, and (3) the Ethernet bandwidth utilization can be optimized. Quality of Service, QoS, enables making on-line tradeoffs between network bandwidth availability and network transmission quality. Examples of QoS include (1) degree of packet collisions when Ethernet is shared by soft- or non-real-time traffics during certain time slots and (2) amount of end-to-end packet transmission latency.

When QoS is used, periodic data, such as video at 30 frames per second may be given a priority or criticality, and a cumulative loss factor, e.g. up to four frames in a row may be discarded. If there is sufficient bandwidth remaining after higher priority tasks or data streams are handled, the video will be accepted to the real time queue with at least five frames per second being sent. If other tasks are deleted or reduced, this frame rate will increase.

Software structuring enables hosting of the real-time Ethernet middleware above the Ethernet network device and the device driver, and below system transport software and/or user applications. A specific example of such a software host is the Microsoft® Network Device Interface Specification (NDIS) with Device Driver Kit (DDK) on Microsoft® NT®-based personal computer platforms. Many other software hosts are available depending upon specific hardware chosen.

The real-time Ethernet middleware comprises two main function modules, a collision avoidance module and a deterministic scheduling module. The collision avoidance module implements a collision-avoidance protocol that provides the capability for preventing Ethernet traffic from colliding, which is one source of the problem of non-deterministic Ethernet behavior. A specific example of such a protocol is a token-based protocol by which a token circulating among the Ethernet nodes determines which node should transmit packets at any point in time. Other collision-avoidance protocols may be used with the invention such as various implementations of Time-Division Multiple Access (TDMA), a technology using Time-Division Multiplexing (TDM). The protocol or standard must merely provide a mechanism to avoid conflict among data transmissions by more than one node at any given time. Either embodiment provides benefits for real time process control, multimedia and Internet applications as well as other applications which might depend on arrival of real time traffic.

The deterministic scheduling module determines if a set of real-time traffic in the entire distributed system can be guaranteed with respect to their timing constraints, such as end-to-end transmission latency.

In one embodiment, the collision-avoidance protocol is switchable to be enabled or disabled as desired by the deterministic scheduling module. This allows the invention to guarantee no collisions of real-time traffic, yet permit collisions of soft- and non-real-time traffic. Such mixed-mode operation could lead to increased bandwidth utilization depending upon the loading during time periods allocated to soft- and non-real-time traffic. Lightly loaded CSMA/CD systems can be more efficient than systems operating on a collision avoidance protocol.

While the Collision-Avoidance Protocol is active, the time set for a complete rotation of transmitting nodes is bounded. In the case of a token-based protocol, the token must return within this bounded time, or token rotation time.

In a further embodiment of the invention, allocation of bandwidth to an individual bridge or node is increased based on underutilization of bandwidth by other bridges or nodes in the network.

While the invention was described in connection with various embodiments, it was not the intent to limit the invention to one such embodiment. Many other embodiments will be apparent to those of skill in the art upon reviewing the above description. In one embodiment of the invention, the QoS module is eliminated. Due to the modular nature of the invention, the system is capable of accepting a QoS module at some later time if desired by the user.

In another embodiment of the invention, multiple local Ethernet networks may be bridged together. Each bridge between networks would accept and schedule messages or streams of data. The data streams held by an individual bridge would be sent when that bridge is designated to transmit, such as when the bridge is in possession of the token in a token-based protocol. New data streams may be refused based on whether the bridge would have sufficient bandwidth to send the data after sending all higher priority messages. To guarantee no collisions for a given period of time, all bridges must be operating in the mode of the collision-avoidance protocol during that period.

What is claimed is:

1. A method of communicating real time traffic on a collision detection based communication network comprising the steps of:

queuing real time traffic separate from non-real time traffic;

sending real time traffic during a first time interval of a communication cycle while using a deterministic scheduling protocol;

prohibiting collision of the real time traffic;

sending non-real time traffic during a second time interval of the communication cycle; and permitting collision of the non-real time traffic.

2. A machine readable medium having instructions stored thereon for causing a computer to implement the steps of claim 1.

3. A method of communicating real time traffic on a collision detection based communication network comprising the steps of:

receiving a request at a node coupled to the communication network indicating that it has real time traffic to send;

determining if a given quality of service can be provided for the real time traffic;

adjusting a first amount of time per communication cycle granted to non-real time traffic if said quality of service cannot be provided; and accepting the real time traffic request.

4. A machine readable medium having instructions stored thereon for causing a computer to implement the steps of claim 3.

5. The method of claim 3 and further comprising the steps of:

queuing the real time traffic separate from non-real time traffic;

sending real time traffic during the first amount of time of the communication cycle while using a deterministic scheduling protocol; and sending non-real time traffic during a second amount of time of the communication cycle.

6. A machine readable medium having instructions stored thereon for causing a computer to implement the steps of claim 5.

7. A node coupled to a collision detection based communication network comprising:

a first queue that queues real time traffic;

a second queue that queues non-real time traffic;

a scheduler that schedules real time traffic for sending over the communication network during a first period of time per communication cycle using a deterministic protocol and that provides non-real time traffic for sending over the communication network during a second period of time per communication cycle, wherein the scheduler further prohibits collision of the real time traffic and permits collision of the non-real time traffic.

8. The node of claim 7 and further comprising a quality of service manager that modifies the first and second periods of time based on the type of traffic generated by the node.

9. The node of claim 7 wherein the collision detection based communication network comprises Ethernet, and the collision avoidance protocol comprises a token ring or time division protocol.

10. A communication network comprising:

a plurality of nodes coupled by Ethernet implementing hardware, each node comprising:

a middleware set of software modules that serve real time traffic during a first period of a communication cycle using a deterministic protocol to the hardware, and non-real time traffic during a second period of the communication cycle to the hardware for normal Ethernet transmission such that all the nodes operate using the same protocols during each period, and such that collision of the real time traffic is prohibited and collision of the non-real time traffic is permitted.

11. A communication protocol for an Ethernet network for transmission of real-time and non-real-time data packets, the Ethernet network containing network devices, device drivers, system network transport software and user applications, the communication protocol comprising:

a software structuring module for hosting the communication protocol above the network devices and device drivers, and below system network transport software or user applications;

a deterministic scheduling module for determining the schedulability and order of admission of data packets for transmission across the Ethernet network; and a collision-avoidance protocol module for preventing collision among Ethernet data packets as required by the deterministic scheduling module;

wherein the deterministic scheduling module prohibits collision of real-time data packets and permits collision of non-real-time data packets.

12. The communication protocol of claim 11, wherein the collision-avoidance protocol module is token based.

13. The communication protocol of claim 11, wherein the collision-avoidance protocol module is time-division multiple access based.

14. The communication protocol of claim 11, further comprising:

a quality of service module for making on-line tradeoffs between the Ethernet network availability and the Ethernet network transmission quality.

15. The communication protocol of claim 11, wherein the deterministic scheduling module determines schedulability of real-time data packets according to the following equations:

$$TTRT = \min(P_j)/2, \forall j \qquad \text{Eq. 1:}$$

$$T_{NRT} = TTRT - T_{RT} \qquad \text{Eq. 2:}$$

$$\text{Eq. 3:} \quad H_i = \sum_{j=1}^{m_i} \left\{ \frac{M_j}{\left\lceil \frac{\min(D_j, P_j)}{TTRT} \right\rceil - 1} + O_j \right\}$$

$$\text{Eq. 4:} \quad \sum_{i=1}^{n} H_i + T_{NRT} \leq TTRT$$

where:

TTRT is the target token rotation time;

$T_{RT}$ is the time interval for transmitting real-time traffic;

$T_{NRT}$ is the time interval for transmitting soft- or non-real-time traffic;

I is the node number;

j is the data stream number;

$H_i$ is the token holding time of individual node I;

$O_j$ is the software overhead of transmitting data stream j;

n is the total number of nodes; and $m_i$ is the total number of real-time packets for transmission within $H_i$; and wherein a real-time data packet is schedulable if Equation 4 evaluates to true given Equations 1, 2 and 3.

16. A communication protocol for an Ethernet network for transmission of real-time and non-real-time data packets comprising a deterministic scheduling algorithm wherein the deterministic scheduling algorithm:

will guarantee transmission of both real-time and non-real-time data packets;

will permit transmission of real-time data packets only if such packet will not conflict with transmission of other data packets;

will prohibit collision of the real-time data packets;

will permit collision of the non-real-time data packets; and will optimize utilization of the Ethernet network.

17. The communication protocol of claim 16, wherein the deterministic scheduling algorithm comprises the following equations:

$$TTRT = \min(P_j)/2, \forall j \qquad \text{Eq. 1:}$$

$$T_{NRT} = TTRT - T_{RT} \qquad \text{Eq. 2:}$$

$$\text{Eq. 3:} \quad H_i = \sum_{j=1}^{m_i} \left\{ \frac{M_j}{\left\lceil \frac{\min(D_j, P_j)}{TTRT} \right\rceil - 1} + O_j \right\}$$

$$\text{Eq. 4:} \quad \sum_{i=1}^{n} H_i + T_{NRT} \leq TTRT$$

where:

TTRT is the target token rotation time $T_{RT}$ is the time interval for transmitting real-time traffic;

$T_{NRT}$ is the time interval for transmitting soft- or non-real-time traffic;

I is the node number;

j is the data stream number;

$H_i$ is the token holding time of individual node I;

$O_j$ is the software overhead of transmitting data stream j;

n is the total number of nodes; and $m_i$ is the total number of real-time packets for transmission within $H_i$; and such that a real-time data packets will be permitted transmission only if Equation 4 evaluates to true given Equations 1, 2 and 3.

18. A communication protocol for an Ethernet network for transmission of real-time and non-real-time data packets, the Ethernet network containing network devices, device drivers, system transport software and user applications, the communication protocol comprising:

software structuring means for hosting the communication protocol above the network devices and device drivers, and below system transport software and user applications;

deterministic scheduling means for scheduling admission of data packets for transmission across the Ethernet network; and collision-avoidance protocol means for preventing collision among Ethernet data packets as required by the deterministic scheduling means;

wherein the deterministic scheduling means prohibits collision of real-time data packets and permits collision of non-real-time data packets.

19. The communication protocol of claim 18, further comprising:

quality of service means for making on-line tradeoffs between the Ethernet network availability and the Ethernet network transmission quality.

* * * * *